(12) United States Patent
Takai

(10) Patent No.: US 11,322,755 B2
(45) Date of Patent: May 3, 2022

(54) FUEL CELL DEVICE

(71) Applicant: Suzuki Motor Corporation, Hamamatsu (JP)

(72) Inventor: Yoshifumi Takai, Shizuoka (JP)

(73) Assignee: SUZUKI MOTOR CORPORATION

( * ) Notice: Subject to any disclaimer, the term of this patent is extended or adjusted under 35 U.S.C. 154(b) by 115 days.

(21) Appl. No.: 16/793,487

(22) Filed: Feb. 18, 2020

(65) Prior Publication Data

US 2020/0266456 A1    Aug. 20, 2020

(30) Foreign Application Priority Data

Feb. 19, 2019 (JP) .............................. JP2019-027447

(51) Int. Cl.
| | | |
|---|---|---|
| *H01M 8/026* | (2016.01) | |
| *H01M 8/0267* | (2016.01) | |
| *H01M 8/1004* | (2016.01) | |
| *H01M 8/2465* | (2016.01) | |

(52) U.S. Cl.
CPC ......... *H01M 8/026* (2013.01); *H01M 8/0267* (2013.01); *H01M 8/1004* (2013.01); *H01M 8/2465* (2013.01)

(58) Field of Classification Search
CPC .. H01M 8/026; H01M 8/0267; H01M 8/2465; H01M 8/1004
See application file for complete search history.

(56) References Cited

U.S. PATENT DOCUMENTS

| | | | | |
|---|---|---|---|---|
| 7,531,265 B2 * | 5/2009 | Sugiura | ............... | H01M 8/0297 429/434 |
| 2004/0157111 A1 * | 8/2004 | Sakamoto | ........... | H01M 8/0258 429/414 |
| 2010/0104921 A1 * | 4/2010 | Park | .................... | H01M 8/0263 429/483 |
| 2011/0165493 A1 | 7/2011 | Okanishi et al. | | |
| 2014/0147763 A1 | 5/2014 | Quintieri | | |
| 2017/0229717 A1 | 8/2017 | Luong et al. | | |

FOREIGN PATENT DOCUMENTS

| | | |
|---|---|---|
| EP | 2131430 A1 | 12/2009 |
| JP | 2005203288 A | 7/2005 |

OTHER PUBLICATIONS

French Preliminary Search Report for Application No. 2001363 dated Feb. 28, 2022, pp. 1-8.

* cited by examiner

*Primary Examiner* — Stewart A Fraser
(74) *Attorney, Agent, or Firm* — Lerner, David, Littenberg, Krumholz & Mentlik, LLP

(57) ABSTRACT

This disclosure describes a fuel cell device having a unit cell structure including a pair of separators stacked on each side of a membrane electrode assembly via diffusion layers, the pair of separators including a number of grooves and convex parts extending between the grooves formed on a side of a contact surface with the gas diffusion layers, one of the pair of separators being a hydrogen electrode side separator having the grooves as hydrogen channels and the other of the pair of separators being an air electrode side separator having the grooves as air channels. The respective grooves of the air electrode side separator have the same width and are arranged at equal intervals, and the respective grooves of the hydrogen electrode side separator have the same width as that of the respective grooves of the air electrode side separator.

4 Claims, 4 Drawing Sheets

FUEL CELL DEVICE

CROSS-REFERENCE TO RELATED APPLICATIONS

The present application claims the benefit of Japanese Patent Application No. 2019-027447, filed on Feb. 19, 2019, the disclosure of which is hereby incorporated herein by reference.

BACKGROUND OF THE INVENTION

Technical Field

The present invention relates to a fuel cell device, and more specifically, relates to a unit cell structure constituting a fuel cell stack.

Background Art

A fuel cell, for example, a solid high polymer type fuel cell, is a power generation apparatus that includes a fuel cell stack obtained by stacking a number of unit cells via a cooling layer, each of the unit cell being formed by stacking a separator on each side of a membrane electrode assembly including an electrode layer on each side of an electrolyte membrane via a gas diffusion layer, in which a high-pressure hydrogen fuel is supplied to a channel formed in the separators on one hydrogen electrode side to cause electrochemical reaction with oxygen supplied to a channel of the separator on the other air electrode side, and thereby electric power is extracted from chemical energy of the hydrogen fuel (e.g., see Japanese Patent Publication JP 2005-203288 A).

BRIEF SUMMARY OF THE INVENTION

Problems to be Solved by the Invention

The channel of the separator on the air electrode side also has a function as a drainage channel for water generated by reaction. Patent Document 1 discloses increasing the groove width of the channel on the air electrode side at the center and reducing the groove width of the channel on the hydrogen electrode side to improve drainage performance of water generated at a low load.

However, when the channel width is changed, there are problems such as not only is a ratio of contact area of remaining convex parts reduced, but also, an engagement ratio of the convex parts between the hydrogen electrode side and the air electrode side is reduced, causing electric resistance to increase.

The present invention has been made in view of the above problems of the prior art, and an object of the present invention is to provide a fuel cell having a unit cell structure advantageous for achieving both power generation performance and drainage performance of water generated.

Means for Solving the Problems

As a result of extensive investigation to solve the above problems, the present inventor has come up with the present invention after obtaining knowledge that since hydrogen is more likely to diffuse in the gas diffusion layer than oxygen, even when a hydrogen channel density is reduced and the convex parts are widened, there would be no shortage of hydrogen necessary for reaction.

That is, the present invention is a fuel cell device including a membrane electrode assembly having an electrode layer on each side of an electrolyte membrane and a pair of separators stacked on each side of the membrane electrode assembly via a gas diffusion layer, each of the pair of separators including a number of grooves and convex parts extending between the grooves formed on a side of a contact surface with the gas diffusion layer, one of the pair of separators being a hydrogen electrode side separator having the grooves as hydrogen channels and the other of the pair of separators being an air electrode side separator having the grooves as air channels, characterized in that the respective grooves of the air electrode side separator have the same width and are arranged at equal intervals, and the respective grooves of the hydrogen electrode side separator have the same width as that of the respective grooves of the air electrode side separator and are provided at the same positions in the width direction as the corresponding grooves of the respective grooves of the air electrode side separator, but the grooves are provided for every one or several grooves of the air electrode side separator in at least a partial region in the width direction.

Advantages of the Invention

As described above, the fuel cell according to the present invention has a configuration in which the respective grooves of the air electrode side separator have the same width and are arranged at equal intervals, the respective grooves of the hydrogen electrode side separator have the same width as the grooves of the air electrode side separator and are provided at the same positions in the width direction as the corresponding grooves of the air electrode side separator, and so the convex parts between the grooves on the hydrogen electrode side and the air electrode side have surface contact with one another, causing the engagement ratio of the convex parts on the hydrogen electrode side and the air electrode side to increase, and it is thereby possible to reduce penetration resistance and contact resistance, and furthermore, because of the configuration in which the respective grooves of the hydrogen electrode side separator are provided for every one or several grooves of the air electrode side separator in at least a partial region in the width direction (the convex parts of the hydrogen electrode side separator are provided for every two or several grooves of the air electrode side separator), the ratio of contact area increases and it is possible to improve current collecting efficiency on the hydrogen electrode side separator, and the number of grooves of the air electrode side separator and the hydrogen electrode side separator are secured to a maximum, which also provides good drainage performance.

DETAILED DESCRIPTION

Figure 1:
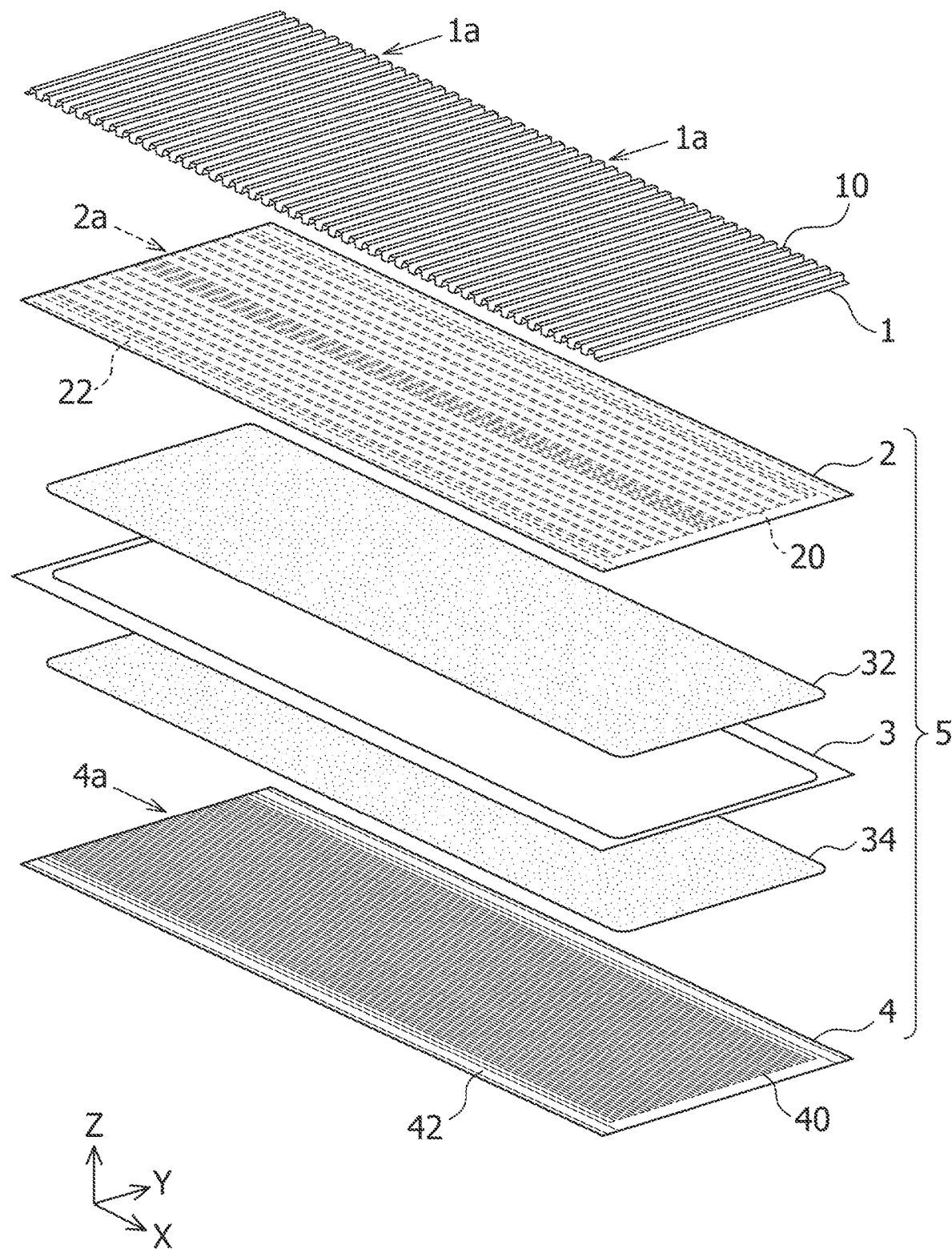
FIG. 1 is an exploded perspective view illustrating a unit cell configuration of a fuel cell according to an embodiment of the present invention.
Figure 2:
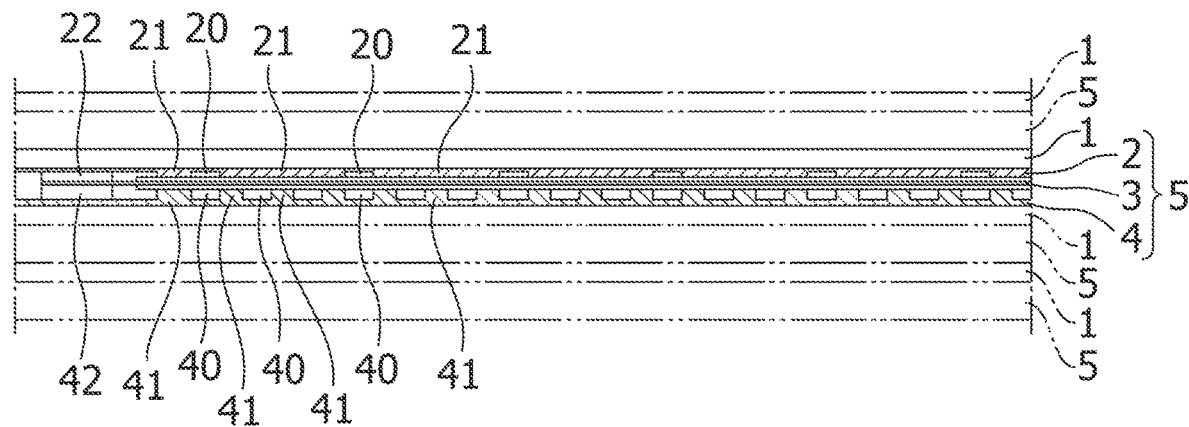
FIG. 2 is a Y direction cross-sectional view of FIG. 1 illustrating a fuel cell stack in which unit cells are stacked.

Hereinafter, an embodiment of the present invention will be described in detail with reference to the accompanying drawings.

In FIG. 1 to FIG. 6, a fuel cell stack constituting a main part of a fuel cell device is constructed by stacking multiple unit cells 5 via a cooling plate 1, the unit cells 5 each being made up of a hydrogen side separator 2 and an air side separator 4 stacked on each side of a membrane electrode assembly 3 via gas diffusion layers 32 and 34.

As shown in FIG. 1, the cooling plate 1 has a corrugated board shape having a number of grooves 10 that define cooling air channels 1a parallel to a width direction Y of the unit cells 5, and is manufactured of a metal material, a carbon material or the like with good conductivity or thermal conductivity.

The membrane electrode assembly 3 (MEA) is obtained by joining an electrode layer to each side of an electrolyte membrane (high polymer electrolyte membrane, PEM) that selectively transmits hydrogen ions, the electrode layer (catalyst layer) includes a fuel electrode (anode) and an air electrode (cathode) and is formed of a platinum catalyst supported on a carbon black carrier or the like.

The hydrogen side separator 2 has a number of grooves 20 that define hydrogen channels 2a extending in parallel to the longitudinal direction X formed on a side of contact surface with the gas diffusion layer 32 which is an undersurface side in FIG. 1, and convex parts 21 are formed between the grooves 20. Each groove 20 has a rectangular cross section of the same width and each convex part 21 has a flat top surface.

Figure 3:
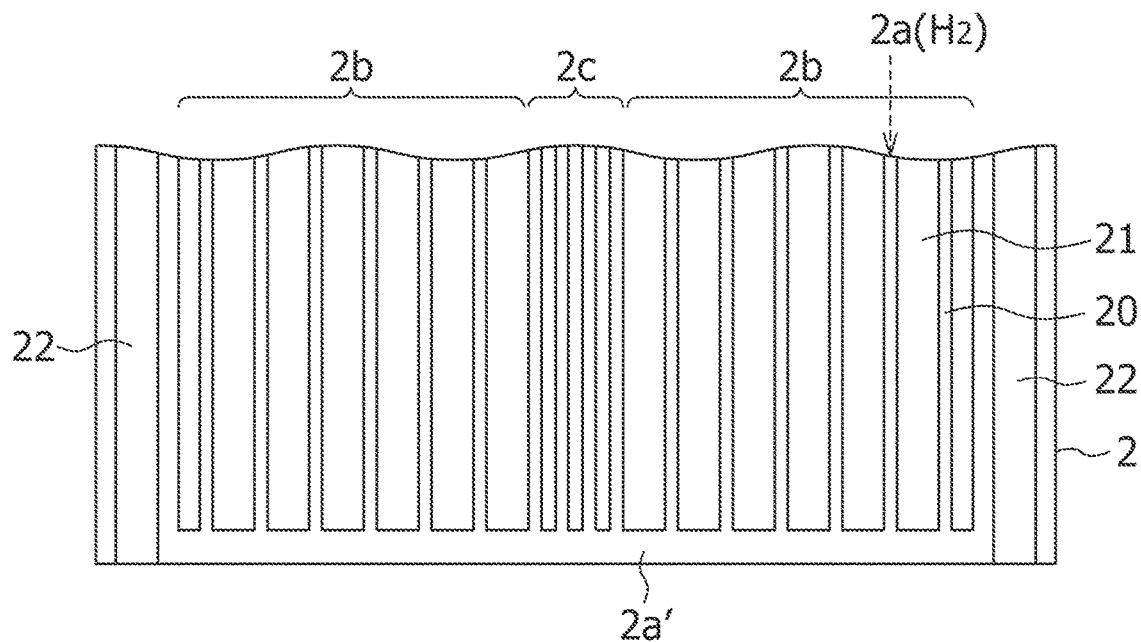
FIG. 3 is a bottom view of main parts illustrating a hydrogen electrode side separator according to the embodiment of the present invention.

Note that as shown in FIG. 3, each convex part 21 is terminated before an end of the hydrogen side separator 2 and an integrated hydrogen channel 2a' for diversion/confluence is defined at an end of the hydrogen side separator 2. Although omitted in each drawing, the integrated hydrogen channel 2a' of each unit cell 5 communicates with a hydrogen supply channel/discharge channel that penetrates the end of each unit cell 5 in the thickness direction Z, and is enabled to supply/discharge a hydrogen gas therethrough.

The air side separator 4 includes a number of grooves 40 that define air channels 4a extending parallel to the longitudinal direction X formed on the side of the contact surface with the gas diffusion layer 34 which is a top surface side in the drawing, and convex parts 41 are formed between the respective grooves 40. The respective grooves 40 have a rectangular cross section of the same width and are arranged at equal intervals, and each convex part 41 has a flat top surface and has the same width except both side end portions adjacent to a gasket 42.

Each groove 20 of the hydrogen side separator 2 has the same width as that of the groove 40 of the air side separator 4 and is provided opposite to the corresponding groove 40 of the grooves 40 at the same position in the width direction, but in the both side regions 2b except the central region 2c in the width direction (central region 2c and both end regions in the width direction in the illustrated example), the grooves 20 are provided for every two grooves 40, the respective convex parts 21 are provided over three convex parts 41 of the air electrode side separator 4. Therefore, each convex part 21 has a wide width summing up widths of the three convex parts 41 and widths of two grooves 40.

Figure 4:
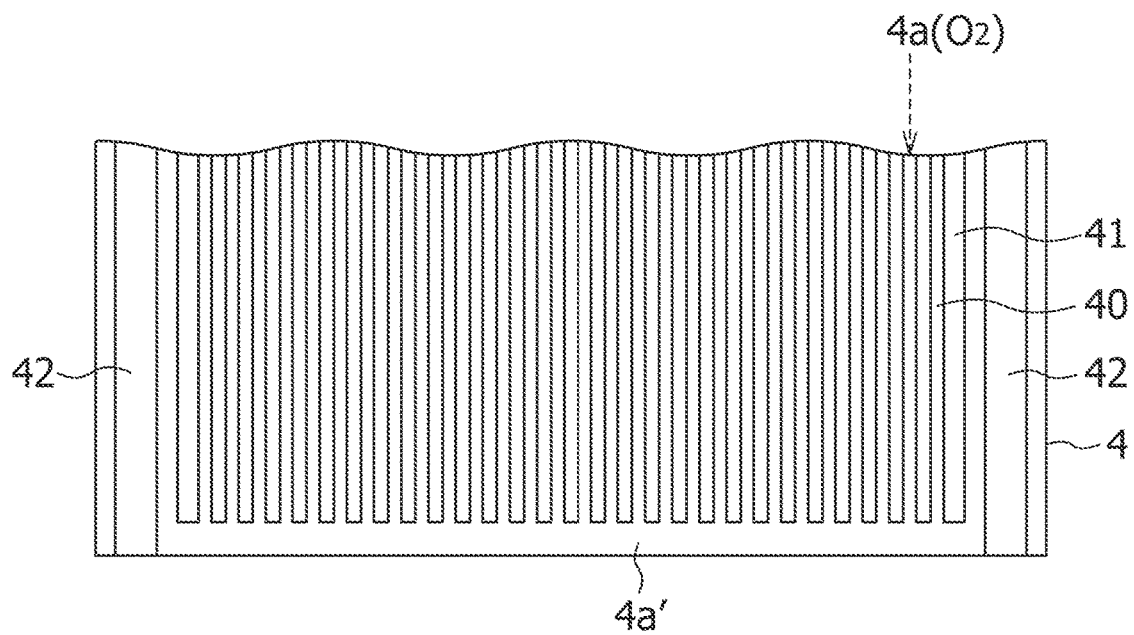
FIG. 4 is a plan view of main parts illustrating an air electrode side separator according to the embodiment of the present invention.

Note that the convex parts 21 and 41 of both side end parts adjacent to the gaskets 22 and 42 have somewhat greater widths than other convex parts 41. Furthermore, as shown in FIG. 4, each convex part 41 is terminated before an end of the air side separator 4, and an integrated air channel 4a' for diversion/confluence is also defined at an end of the air side separator 4. Although omitted in the respective drawings, the integrated air channel 4a' of each unit cell 5 communicates with the air supply channel/discharge channel that penetrate the end part of each unit cell 5 in the thickness direction (stacking direction) Z and is configured to be able to supply/discharge air therethrough similar to the hydrogen side.

Figure 5:
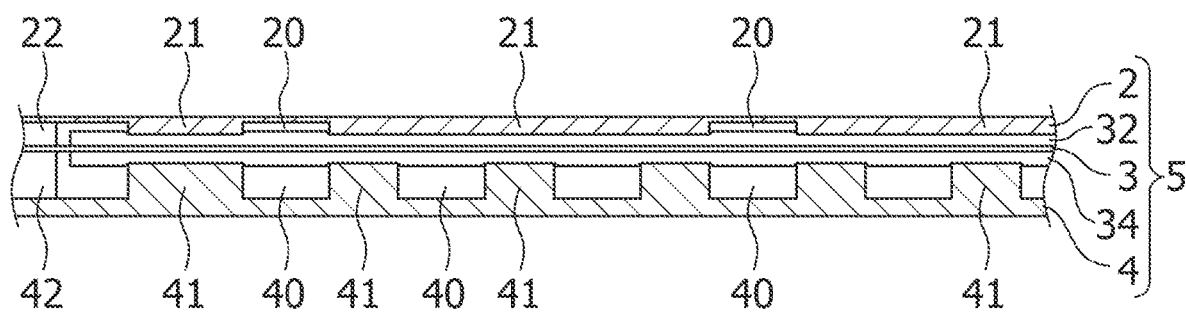
FIG. 5 is an enlarged cross-sectional view of main parts of FIG. 2 illustrating a unit cell according to the embodiment of the present invention.
Figure 6:
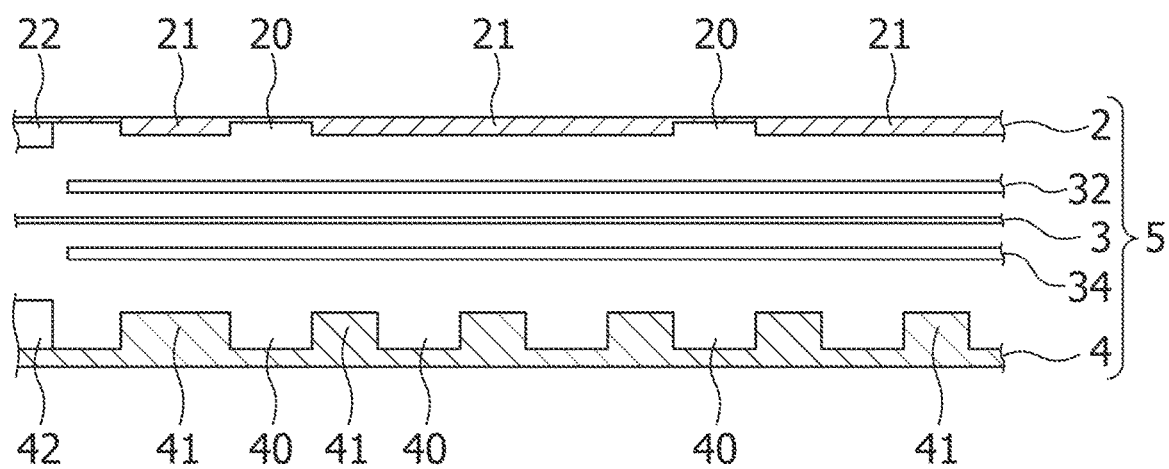
FIG. 6 is an exploded cross-sectional view corresponding to FIG. 5 illustrating the unit cell according to the embodiment of the present invention.

Furthermore, as shown in FIGS. 5 and 6, the hydrogen side separator 2 is thinner than the air side separator 4 and each groove 20 of the hydrogen side separator 2 is shallower than each groove 40 of the air side separator 4 that also serves as a discharge channel of water generated. The hydrogen side separator 2 and the air side separator 4 also serve as a current collecting electrode/power supply electrode, and are manufactured of a metal material or a carbon material or the like with good electrical conductivity or thermal conductivity.

The gas diffusion layers 32 and 34 (GDL) have a function of diffusing hydrogen supplied through the hydrogen channel 2a and oxygen in the air supplied through the air channel 4a in a surface direction and diffusing the hydrogen and oxygen uniformly over the electrode layer of the membrane electrode assembly 3, and a function of collecting electrons generated by chemical reaction at the fuel side electrode and discharging purified water generated at the air side electrode, and the gas diffusion layers 32 and 34 are made of carbon paper or carbon cloth or the like having good gas permeability and electric conductivity.

Since the gas diffusion layers 32 and 34 having the above configuration are more flexible than the other components of the unit cell 5, in a pre-stacking state as shown in FIG. 6, the layers have a sheet-like form of uniform thickness, whereas as shown in FIG. 5, when the hydrogen side separator 2 and the air side separator 4 are stacked via the gas diffusion layers 32 and 34 on each side of the membrane electrode assembly 3 to constitute the unit cell 5, the gas diffusion layers 32 and 34 are sandwiched and compressed between the convex parts 21 and 41 of the hydrogen side separator 2 and the air side separator 4, and an engagement structure is formed such that each convex part 21, 41 bites into each gas diffusion layer 32, 34 and on the other hand, in each groove part 20, 40, the gas diffusion layer 32, 34 bites into each groove part 20, 40.

In the engagement structure between the gas diffusion layers 32 and 34, and the hydrogen side separator 2 and the air side separator 4, a degree of compression deformation of the gas diffusion layers 32 and 34 by each convex part 21, 41 and each groove part 20, 40 is appropriately adjusted through dimensional management on the overall thickness when a number of unit cells 5 are stacked via the cooling plate 1 to constitute a fuel cell stack.

In the fuel cell device configured as described above, the convex part 41 of the air side separator 4 in each unit cell 5 is configured to always make surface contact at a position where the convex part 21 of the hydrogen side separator 2 exists, which is a configuration advantageous for reducing penetration resistance and contact resistance and improving power generation performance.

With the configuration in which each groove 20 of the hydrogen electrode side separator 2 is provided for every two grooves 40 of the air electrode side separator 4 in both side regions 2b in the width direction and the convex parts 21 of the hydrogen electrode side separator 2 are provided over three convex parts 41 of the air electrode side separator 4, the ratio of contact area of the membrane electrode assembly 3 and the gas diffusion layer 32 via the convex part 21 of the hydrogen electrode side separator 2 increases, and it is thereby possible to improve power generation performance and improve current collecting efficiency at the widened convex parts 21.

Moreover, the number of grooves 40 of the air electrode side separator 4 which becomes a drainage channel for water generated is secured to a maximum, and the number of grooves 20 of the hydrogen electrode side separator 2 in the central region 2c where water is easily accumulated is also secured to a maximum, and drainage performance is also good.

Hereinafter, the above operations and effects will be described in detail with reference to FIG. 7.

Figure 7:
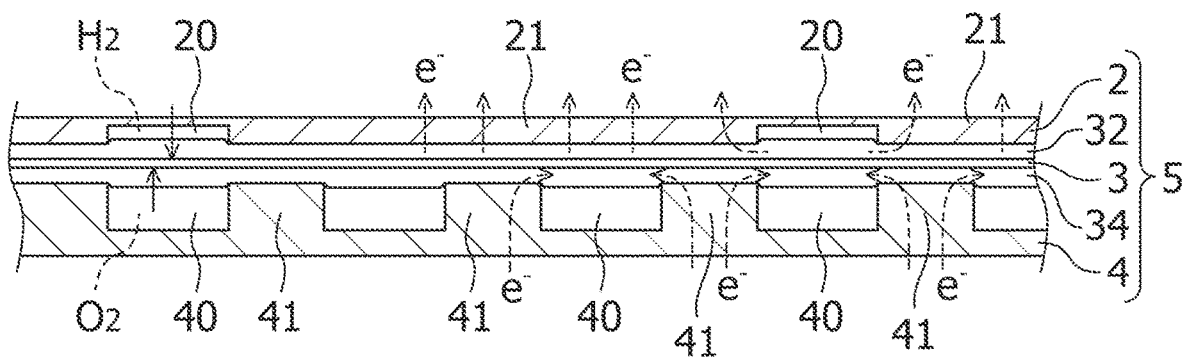
FIG. 7 is an enlarged cross-sectional view of main parts of FIG. 5 illustrating movement of electrons in the unit cell.

FIG. 7 illustrates electrochemical reaction and movement of electrons (e⁻) in the unit cell 5. In FIG. 7, hydrogen ($H_2$) supplied through the groove 20 of the hydrogen electrode side separator 2 is diffused by the gas diffusion layer 32 in the surface direction along the fuel electrode (catalyst layer) on the top surface side of the membrane electrode assembly 3. On the other hand, oxygen ($O_2$) in the air supplied through the groove 40 of the air electrode side separator 4 is diffused by the gas diffusion layer 34 along the air electrode (catalyst layer) on the undersurface side of the membrane electrode assembly 3.

In this case, since hydrogen ($H_2$) has better diffusibility than oxygen ($O_2$), hydrogen is diffused uniformly over the entire top surface of the membrane electrode assembly 3 even when the installation interval of the grooves 20 is large. On the other hand, although oxygen ($O_2$) is inferior in diffusibility, the installation interval of the groove 40 is small, and oxygen is diffused uniformly over the entire undersurface of the membrane electrode assembly 3 and the amount of oxygen necessary for reaction is secured.

The hydrogen ($H_2$) that is diffused uniformly over the entire top surface of the membrane electrode assembly 3 is decomposed by action of the catalyst at the fuel electrode (catalyst layer) into hydrogen ions ($H^+$) and electrons ($e^-$), and electrons ($e^-$) are collected through the gas diffusion layer 32 and the convex parts 21. The hydrogen ions ($H^+$) pass through the membrane electrode assembly 3, combine with oxygen ($O_2$) at the air electrode (catalyst layer) to generate water. The water generated is discharged through the groove 40.

The fuel cell stack is constructed of the unit cells 5 connected in series via the conductive cooling plate 1, and the electrons (e) collected by the hydrogen electrode side separator 2 are supplied to the adjacent air electrode side separator 4 via the cooling plate 1, used for reaction in the air electrode (catalyst layer), potential is generated at both ends of the series connection of the unit cell 5 and the fuel cell stack functions as a power generation apparatus.

Part of the water generated at the air electrode (catalyst layer) of the membrane electrode assembly 3 moves to the fuel electrode side by means of concentration diffusion and is discharged through the grooves 20 of the hydrogen electrode side separator 2.

Note that although a case has been described in the above embodiment in which each groove 20 of the hydrogen electrode side separator 2 in the unit cell 5 is provided for every two grooves 40 of the air electrode side separator 4 in the both side regions 2b in the width direction, each groove 20 of the hydrogen electrode side separator 2 may be provided for every two grooves 40 of the air electrode side separator 4 in other regions in the width direction or all regions in the width direction or each groove 20 of the hydrogen electrode side separator 2 may be provided for every one or 3 to 5 grooves 40 of the air electrode side separator 4.

Furthermore, although a case has been described in the above embodiment in which the respective grooves 20 and 40 of the hydrogen electrode side separator 2 and the air electrode side separator 4 are provided linearly in the longitudinal direction of the unit cell 5, the respective grooves 20 and 40 may be formed into the same waveforms extending in the longitudinal direction of the unit cell 5 and having amplitude in the width direction. Such a configuration is advantageous for improving diffusibility of gas.

Additionally, although several embodiments of the present invention have been described so far, the present invention is not limited to these embodiments, and various modifications or changes can further be made based on the technical concept of the present invention.

DESCRIPTION OF SYMBOLS

1 cooling plate
1a cooling air channel
2 hydrogen side separator
2a hydrogen channel
2b both side regions
2c central region
3 membrane electrode assembly (MEA)
3a air channel
4 air side separator
5 unit cell
10 groove (cooling air channel)
20 groove (hydrogen channel)
21, 41 convex part
22, 42 gasket
32, 34 gas diffusion layer
40 groove (air channel)

The invention claimed is:

1. A fuel cell device having a unit cell structure comprising:
a membrane electrode assembly having an electrode layer on each side of an electrolyte membrane; and
a pair of separators stacked on each side of the membrane electrode assembly via a gas diffusion layer, the pair of separators including a number of grooves and convex parts extending between the grooves formed on a side of the surface of contact with the gas diffusion layer, one of the pair of separators being a hydrogen electrode side separator having the grooves as hydrogen channels and the other of the pair of separators being an air electrode side separator having the grooves as air channels,
wherein the respective grooves of the air electrode side separator have the same width and are arranged at equal intervals, and the respective grooves of the hydrogen electrode side separator have a same width as that of the respective grooves of the air electrode side separator and are provided at the same positions in the width direction as the corresponding grooves of the respective grooves of the air electrode side separator, but the grooves are provided for every two or more grooves of the air electrode side separator in at least a partial region in the width direction.

2. The fuel cell device according to claim 1, wherein the respective grooves of the air electrode side separator and the respective grooves of the hydrogen electrode side separator are formed linearly and parallel to the longitudinal direction of the air electrode side separator and the hydrogen electrode side separator.

3. The fuel cell device as claimed in claim 1, wherein the respective grooves of the air electrode side separator and the respective grooves of the hydrogen electrode side separator are formed into waveforms extending in the longitudinal direction of the air electrode side separator and the hydrogen electrode side separator and having amplitude in the width direction.

4. The fuel cell device according to claim 1, wherein the at least a partial region is a central region in the width direction or both side regions except the central region and both end regions, and in the regions other than the both side regions, the respective grooves of the hydrogen electrode side separator are provided at the same positions as the respective grooves of the air electrode side separator.

* * * * *